(No Model.) 4 Sheets—Sheet 3.
J. H. PENDLETON.
PUMPING ENGINE.
No. 264,746. Patented Sept. 19, 1882.
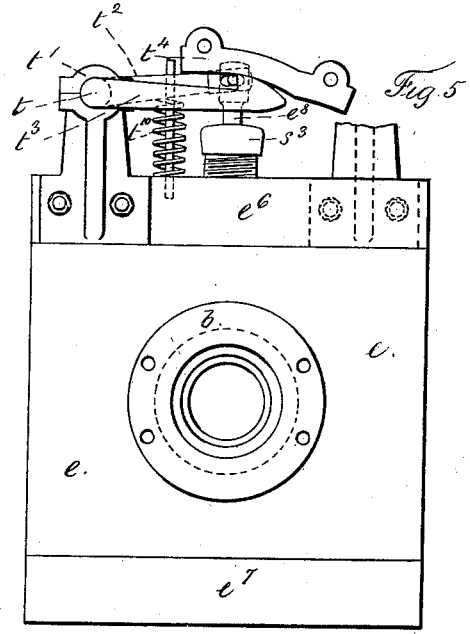
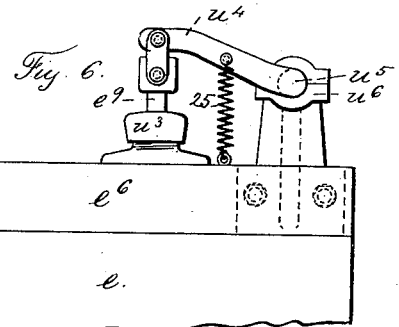
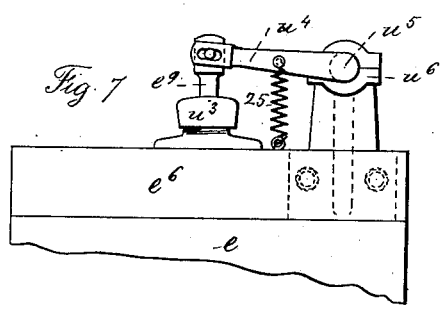
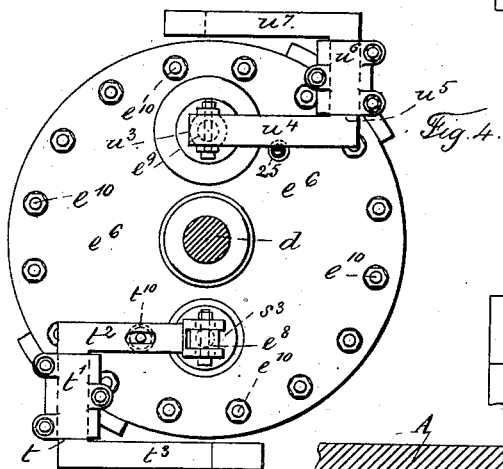
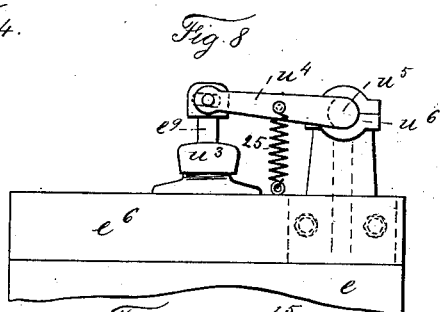
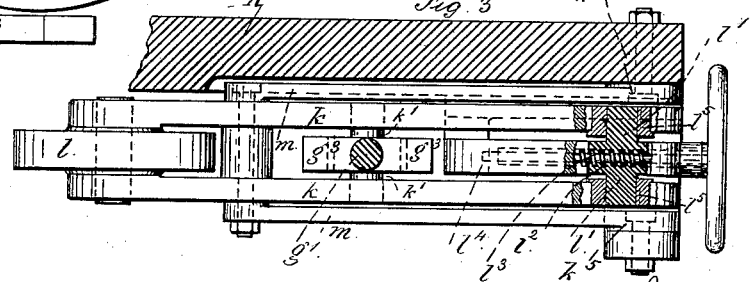
Witnesses:
J. Haib
Chs. H. Smith
Inventor:
John H. Pendleton
Lemuel W. Serrell
per
Atty
N. PETERS. Photo-Lithographer. Washington, D. C.

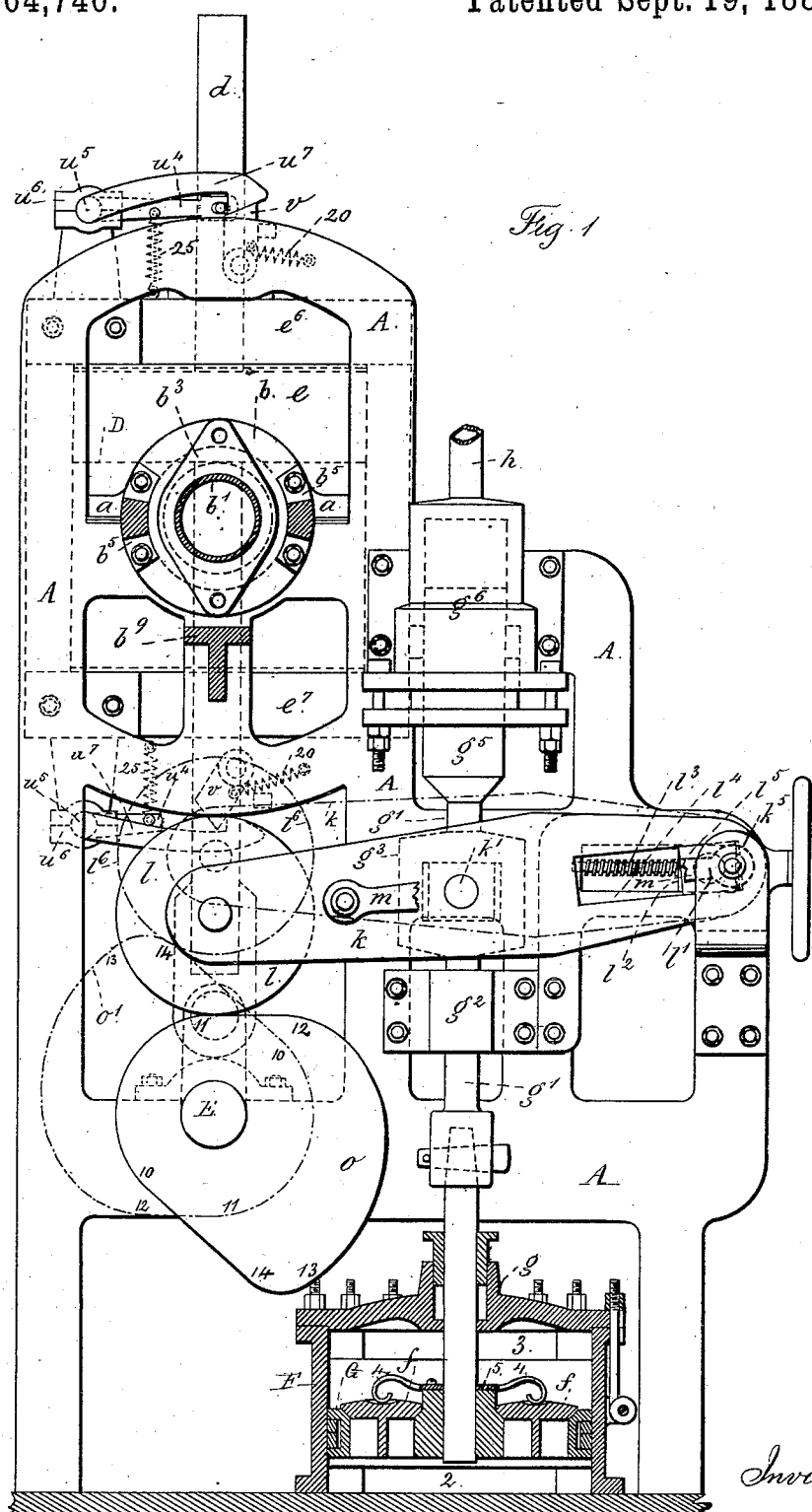

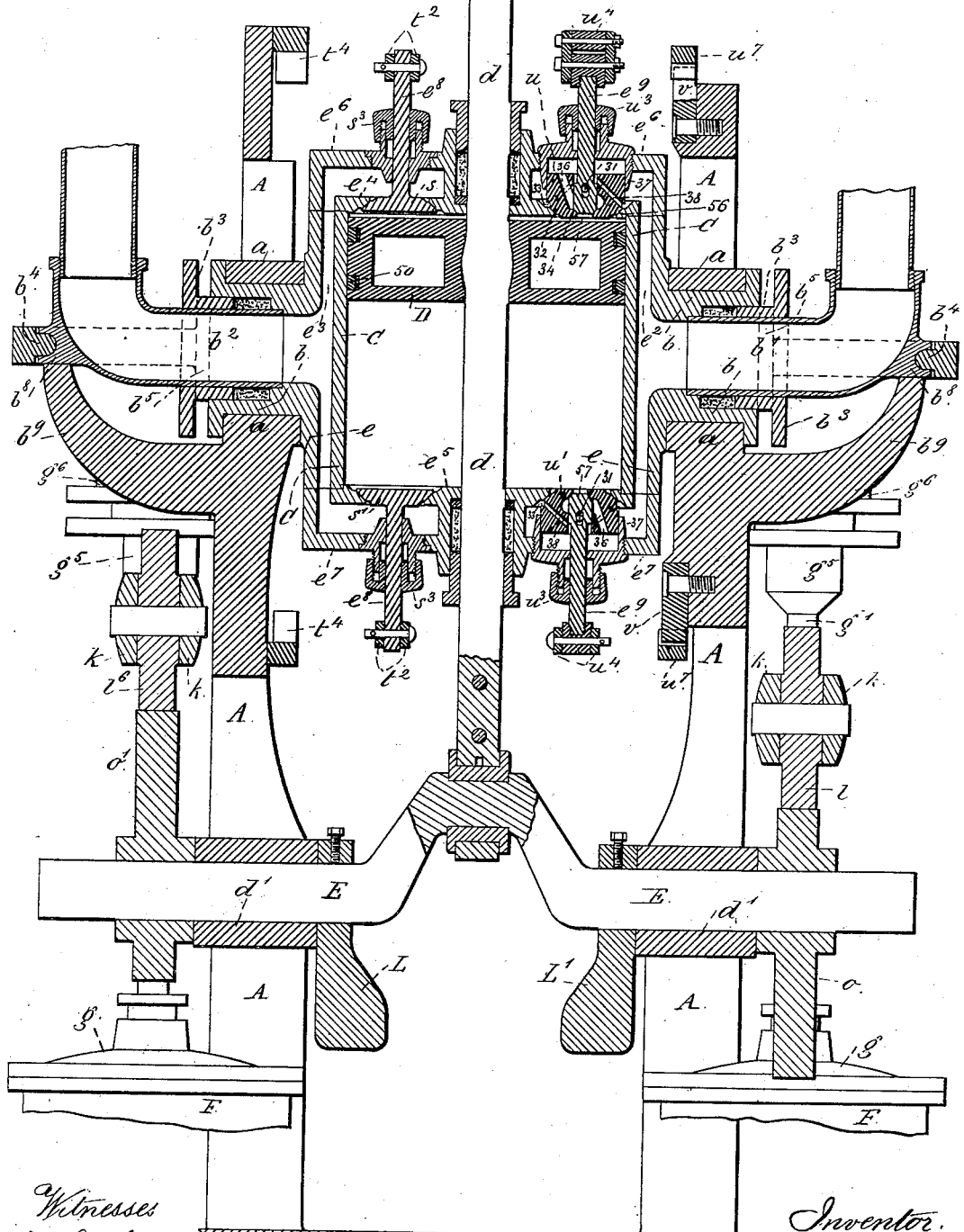

(No Model.)  4 Sheets—Sheet 4.
J. H. PENDLETON.
PUMPING ENGINE.
No. 264,746.  Patented Sept. 19, 1882.
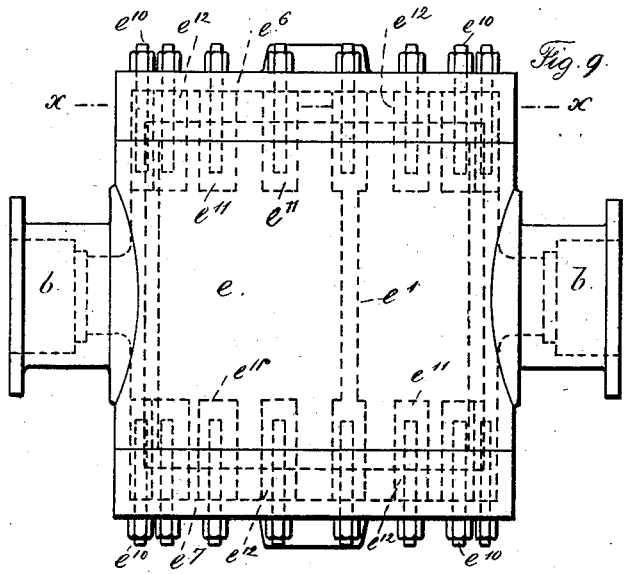
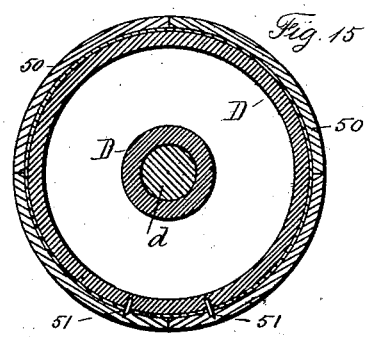
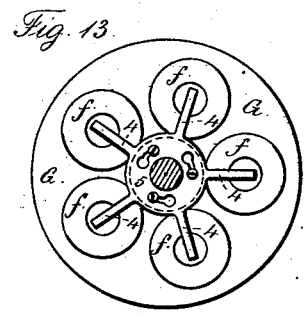
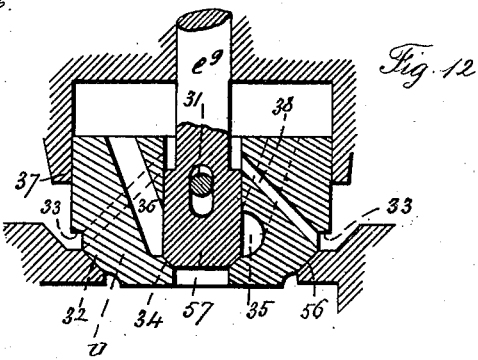
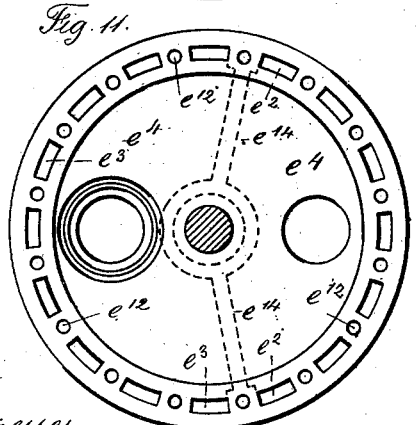
Witnesses
J. Staib
Chas. H. Smith
Inventor
John H. Pendleton
Lemuel W. Serrell
per
atty

UNITED STATES PATENT OFFICE.

JOHN H. PENDLETON, OF BROOKLYN, NEW YORK, ASSIGNOR TO HIMSELF AND ALEXANDER H. TIERS AND CORNELIUS TIERS, OF MADISON, N. J.

PUMPING-ENGINE.

SPECIFICATION forming part of Letters Patent No. 264,746, dated September 19, 1882.

Application filed June 5, 1882. (No model.)

*To all whom it may concern:*

Be it known that I, JOHN H. PENDLETON, of Brooklyn, E. D., in the county of Kings and State of New York, have invented an Improvement in Pumping-Engines, of which the following is a specification.

This invention is made for obtaining the direct action of steam without the introduction of a fly-wheel, and for working the steam expansively and for equalizing the forces, so that the motion of the pump will be slower than that of the steam-piston and proportioned to the pressure of the steam as it expands, so that there will be the same force exerted in moving the pump through its entire stroke. In accomplishing these objects I employ an oscillating engine acting upon a crank-shaft, and through rotary cams giving motion to the levers that operate the lift-pumps. The cams are made in such a manner and placed upon the crank-shaft so that the pump mechanism aids in turning the crank-shaft at the time the crank is passing the dead-center. The shape of the cams is such that when the pressure of steam is the strongest the pump-piston will be moving the most rapidly, and as the pressure of steam lessens in consequence of expansion, the movement of the pump-piston will be less in proportion to the movement of the steam-piston.

In the drawings, Figure 1 is an elevation, partially in section. Fig. 2 is a vertical transverse section through the engine and crank. Fig. 3 is a plan, partially in section, of the levers for one of the pumps. Fig. 4 is a plan of the steam-cylinder and rock-shafts for the valves. Fig. 5 is a side view of the steam-cylinder and the arm for the exhaust rock-shaft. Figs. 6, 7, and 8 represent the arms from the rock-shafts to the valve-stems with various connecting devices. Fig. 9 is an elevation, and Fig. 10 a section at $xx$, representing the steam and exhaust ports of the engine. Fig. 11 is an inverted plan of the cylinder-head, the valves being removed. Fig. 12 is a section of the improved steam-valve employed by me. Fig. 13 is a plan of the pump-piston. Fig. 14 is a side view, and Fig. 15 a horizontal section, of the steam-piston.

I make use of two side frames, A A, having bearings at $a$ for the hollow trunnions $b$ of the steam-cylinder C.

D is the steam-piston; $d$, the rod.

E is the crank-shaft in bearing $d'$ in the main frame.

F F are the pump-cylinders with suitable inlet-ports, 2, and discharge-ports 3. The inlet-valves are of any desired character. These are not shown in the drawings.

I prefer to employ a piston, G, with valves in it; but any desired character of pump may be used. I have shown the five valves $f$ in the piston G. (See Figs. 1 and 13.) These are lift-valves, and they are provided with spring-arms 4, extending out from a ring, 5, that surrounds the piston-rod, and is connected to the hub of the piston by screws in slots. The ends of these arms 4 bear upon the valves and serve as springs for the same; but by turning the ring 5 partially around the curved ends of the spring-arms will be moved out of the recessed upper surfaces of the valves, and said valves can then be lifted out for cleaning or repairs, after which the spring-arms are restored to place by turning them and the ring around to the normal position. The ends of the slots in the rings are enlarged for passing the screw-heads, if it becomes necessary to lift the ring and spring-arms. This feature, however, is not claimed herein, but reserved for a separate application.

There are two pumps—one at each side of the apparatus—and one of them is operated to raise the liquid as the steam-piston ascends, the other as the steam-piston descends. The weight of the piston-rod and parts attached to each pump will usually be sufficient to cause the pump-pistons to descend; but I use a steam-pressure to aid in carrying the pump-pistons down, in order that that pressure may be exerted also in causing the crank to turn the dead-centers.

Each pump piston-rod is extended upwardly through the gland in the head $g$. It is coupled to the rod $g'$, which is guided in the bearing $g^2$, and is provided with a yoke, $g^3$, (see Fig. 3 and the dotted lines, Fig. 1,) and the upper end of the rod $g'$ terminates as a plunger, $g^5$, in the cylinder $g^6$. To this cylinder $g^6$ there is a pipe, $h$, that extends to the boiler or other source of steam-pressure. It makes no difference whether water or steam fills the cylinder $g^6$ so long as the same is exposed to the steam-pressure, because the fluid in said cylinder $g^6$ is simply expelled from said cylinder $g^6$ as the pump is lifted, and it exerts its pressure upon the plunger to force it and the pump-piston down on the return-stroke.

At the sides of each yoke $g^3$ there are levers $k\,k$, and a block within the yoke has trunnions $k'$ passing through holes in the levers $k$. At one end of each pair of levers there is a roller, $l$ or $l^6$, and a fulcrum, $l'$, near the other end. The fulcrum $l'$ may be stationary; but I have shown the same as movable and constructed of trunnions upon a block, $l^2$, that is moved by a screw, $l^3$, within a slotted bar, $l^4$, upon the main frame. The trunnions of the block $l^2$ in this instance form the fulcrum $l'$ of the levers $k$, as such trunnions enter the blocks $l^5$, that are provided in the slotted portions of the levers, and are moved back and forth therein by the action of the screw upon the block $l^2$; but, in order to prevent the levers $k$ themselves being moved or any undue strain acting upon the trunnions $k'$ or pump-rod $g'$, I make use of the links $m\,m$, that are each pivoted at one end to one of the levers $k$ and at the other end, $k^5$, to the frame A, as seen in Fig. 3. By this construction the leverage may be varied, so as to give a greater or less length of motion to the pump. This allows for raising water to the extent of the capacity of the boiler and engine, for if the pressure of steam employed is small or the column of water to be lifted is too great for the power of the engine, with the pump working a full stroke, that stroke of pump can be lessened by moving the fulcrum nearer to the pump-rod $g'$, or the reverse, if the power of the engine is greater than that employed by the pump.

The cams $o\,o'$ upon the crank-shaft E are each made as an arc of a circle between the points 10 and 11, a rapid outward inclination between 11 and 12, and a gradual inclination between 12 and 13, and almost a straight line between 14 and 10, and these cams are at one hundred and eighty degrees apart.

By reference to Fig. 1 it will be seen that the cam $o'$ (shown by dotted lines) is in such a position when the crank reaches its upper turning-point or dead-center the highest point on the cam $o'$ has passed beyond the roller $l^6$, (shown also by dotted lines,) and said roller has commenced to descend. Hence the pressure of the steam, acting upon the plunger $g^5$ to force that and the pump-piston down, causes the roller $l^6$ to act upon the cam between 14 and 10 and turn the crank-shaft past the dead-center, and as soon as the crank-center is turned the steam is admitted and acts in the steam-cylinder with its full pressure to rotate the crank-shaft E and cam $o$, and through the same and the roller $l$ and levers $k$ to lift the piston of the other pump and raise the water. The full pressure of steam is supplied to the cylinder while the cam $o$ is acting between 11 and 12 against the roller $l$. The steam is then cut off and worked expansively, as hereinafter detailed, and during this portion of the stroke the cam $o$ between 12 and 13 is moving in contact with the roller $l$, and the inclined surface of the cam, being gradually at a less inclination to the radius, prevents the engine-piston being stopped in consequence of the expanding steam being insufficient to move the pumps. The cam is thus shaped to exert the power of the engine upon the pump while the steam is working expansively, and the benefit of the expansion of the steam is obtained, and the entire power of the steam is exerted in raising the water; but the speed of movement of the pump is proportioned to the power of the steam as it expands and lessens in pressure.

I prefer to use weighted levers L L' upon the shaft E, placed in such position and of such weight as to counterbalance the weight of the crank and piston-rod, and prevent any tendency of the engine to assume any one particular position when it is stopped.

The cylinder of the engine is upon hollow trunnions $b$, and the pipes $b'\,b^2$ pass into the hollow trunnions, and they have glands or packings $b^3$ around them, so that the cylinder can oscillate upon the trunnions and the pipes remain stationary. There is a bend in each pipe, and upon the axial line of the pipes there are bearing-studs $b^8$ to receive the pivots $b^4$ upon cross-bars that are bolted at their ends $b^5$ to the ends of the trunnions $b$. The object of these bearing-blocks $b^4$ and cross-bars is to prevent the pipes $b'\,b^2$ being driven by the pressure out endwise from the glands in the hollow trunnions, and at the same time to allow the engine-cylinder to oscillate by the action of the piston-rod D and crank-shaft E.

There are arms $b^9$ extending out from the frame A, and receiving in their notched ends the studs $b^8$, thereby supporting the weight of the steam and exhaust pipes.

The steam-cylinder is made with a jacket, $e$, around it, forming steam-spaces that are separated longitudinally by partitions $e'$. The space $e^2$ opens into the pipe $b'$ and is for live steam, and the space $e^3$ opens into the pipe $b^2$ and is for the exhaust.

The steam-cylinder has double heads at each end. The heads $e^4\,e^5$ form or receive the valve-seats, and the heads $e^6\,e^7$ receive the glands of the valve-stems $e^8$ and $e^9$, and there are bolts $e^{10}$, that serve to secure the steam-heads in place upon the cylinder. These bolts are screwed at their inner ends into radial lugs $e^{11}$, that are cast with the cylinder C and jacket $e$, and extend from the one to the other, and they are placed at regular distances apart around the cylinder ends. In the heads $e^6$ and $e^7$ there are tubular openings for these bolts to pass through, as seen at $e^{12}$, Figs. 9 and 10. The inner head, $e^4$, and outer head, $e^6$, are cast together. So, also, are the heads $e^5$ and $e^7$, and between them is cast the partition $e^{14}$, between the steam and exhaust chambers, the partition $e^{14}$ being a continuation of the partition $e'$ at the sides of the cylinder C.

The exhaust-valves $s$ $s'$ are seated inside the heads $e^4$ $e^5$, and open inwardly. The stems $e^8$ pass through the packing-glands $s^3$, that are upon the heads $e^6$ $e^7$, respectively. The pressure of steam keeps these valves closed until the crank and piston-rod come into line at the extreme ends of the stroke, and the valves are then opened by the means next described.

The rock-shaft $t$ is supported in a bearing, $t'$, upon the cylinder-head. It has two arms, $t^2$ $t^3$, the arm $t^2$ passing to the valve-stem, to which it is connected by a hinge or fork. The other arm, $t^3$, passes to the stationary cam $t^4$ upon the frame A. Said cam is adjustable, and as the arm $t^3$ runs under the cam $t^4$ by the oscillation of the cylinder the exhaust-valve is opened, and held open until the piston has completed its stroke, or nearly so, toward that exhaust-valve, when it again closes in consequence of the oscillation separating $t^3$ from $t^4$. The expansive springs $t^{10}$ act to close the exhaust-valves when not acted upon by the cam $t^4$. The exhaust-valve at the other end of the cylinder is operated in a similar manner, the parts being duplicated, but standing in the opposite direction, so as to be operated by the movement of the cylinder as it oscillates in the other direction.

The inlet-valves $u$ and $u'$ are introduced into the steam-chests of the cylinder-heads. They may be ordinary conical valves, such as the exhaust-valves $s$ $s'$, but opening outwardly from the cylinder instead of opening into the cylinder. I however prefer and use the valves hereinafter described, the actuating mechanism next set forth, however, being the same with either form of valve.

The valve-stems $e^9$ pass through the glands $u^3$, and are connected to the respective arms $u^4$ of the rock-shafts $u^5$, that are supported by bearings $u^6$ in each head of the engine, and each rock-shaft has a second arm, $u^7$, extending out over a tripper, $v$, that is pivoted to the frame A, and is similar to a latch, there being a spring, 20, to return the tripper to a normal position against a stop on the frame A.

As the cylinder oscillates the inclined end of the arm $u^7$ runs up the inclined end of the tripper $v$, and thereby the arm $u^7$ is raised and the steam-valve lifted, and when the latch end of $u^7$ runs off the tripper $v$ the arm $u^7$ falls and the valve closes and cuts off the steam, so that the steam works expansively for the remainder of the stroke, and the point at which this cut-off takes place is regulated by adjusting the tripper laterally. As the cylinder oscillates in the other direction the latch end of the rock-shaft arm $u^7$ catches the spring-tripper and swings it back out of the way, and, passing beyond the tripper, the arm and tripper separate, and the latter springs back, ready for the next stroke.

It is to be understood that the steam-valves are operated in the same manner at the two ends of the steam-cylinder. The arms, however, act alternately to open the steam-valves, because the top part of the cylinder is moving in one direction as the bottom part is moving in the opposite direction.

The joints between the valve-stems and rock-shaft arms may be made in either of the ways shown in Figs. 6, 7, or 8, and there is a spring, 25, made use of to close the valve and cut off the steam as soon as the arm $u^7$ passes clear of the tripper $v$.

The steam-valve which I prefer to use is shown in Fig. 12 in larger size. It is a loose cylinder upon the stem $e^9$, and connected by a cross-pin, 31, in a slot in the valve-stem. There is a conical portion, 32, of the valve resting on the valve-seat 56. There is also a shoulder at 33 for the steam-pressure to act against in lifting the valve off its seat when there is no pressure against the other surface of the valve.

The end of the valve-stem is cylindrical with a conical point, and forms the primary valve 57, the seat for which is marked 34. There is a chamber around the stem at 35, and openings 36 from this chamber to the upper or outer surface of the valves, and there is a cylinder, 37, in which the main valve slides steam-tight.

There are one or more steamways, 38, passing from the periphery of the valve to the central cylinder, in which the primary valve 57 slides. The steam enters these orifices and fills the cylinder 37 and presses the valve to its seat; but when the primary valve 57 is raised it closes the inner ends of these steamways 38, excluding steam. At the same time the valve $u$ is raised from its seat 56, and the ports 36 furnish a free escape for the steam from the cylinder 37, and the live steam, acting upon the shoulder 33, raises the valve off its seat and forces it into the cylinder 37. Thereby the steam-valve is opened fully. The reverse movement takes place so soon as the rock-shaft arm $u^7$ runs off the tripper $v$ and the primary valve 57 is closed upon its seat 34 by the action of the spring 25. The steam now enters the cylinder 37 by the ports 38, and forces down the valve $u$ against its seat, cutting off the steam and allowing it to operate in the cylinder expansively.

I construct the packing-rings of the steam and water pistons in such a manner as to allow of the introduction of thin packing-strips from time to time as the packings wear. Figs. 14 and 15 illustrate this feature of improvement. The pistons are turned up with grooves with parallel faces for receiving the ring-sections 50, which sections are tongued at the ends to lap, as seen in Fig. 14. The sections are held from rotating around the piston by the pins 51, set into the piston and entering the recesses in the backs of the respective ring-sections. These ring-sections fit their grooves steam-tight, and in order to allow for wear I introduce from time to time strips of thin sheet brass or copper slightly narrower than the width of the groove, and of a length to extend nearly around the piston in the bottom of the groove, and provided with holes, so as to be hooked upon the pins 51 to steady such strip while the ring-sections are being put into place. In this manner the ring-sections may be set out from time to time to make the same tight with the cylinder. This feature, however, is not claimed herein, but reserved for a separate application.

This improvement may be used either with a pumping-engine or with a pump for supplying feed-water to the boilers, or with any engine where the fly-wheel has to be dispensed with, or where but a small fly-wheel can be used. In those engines where a pump is not connected the plungers will be required for the boiler-pressure to act upon the levers and cams in turning the centers; or, if desired, springs can be substituted for the cylinders $g^5$ and plungers $g^6$.

The steam-valves hereinbefore described are especially adapted to this particular engine, because they open and close suddenly and by the direct action of the steam, thereby admitting and cutting off the steam, so as to work expansively.

I claim as my invention—

1. The combination, with an oscillating steam-engine cylinder, piston, piston-rod, and crank-shaft, of two cams upon the crank-shaft, two rollers, and levers carrying the same, means for applying a yielding pressure to the levers, the parts being arranged substantially as set forth, so that the cams, levers, and rollers act in succession to move the crank over the center, as specified.

2. The combination, in an oscillating engine, of the cylinder, piston, piston-rod, crank-shaft, cams $o$ $o'$, roller $l$ $l^6$, levers $k$, pumps, plungers, and cylinders, and a connection from the same to the boiler, substantially as set forth.

3. The combination, with the oscillating engine, cut-off valves, and their actuating mechanism, of the pumps, levers for actuating the same, and cams upon the crank-shaft of the engine, shaped substantially as specified, to move the pumps in proportion to the pressure as the steam expands in the cylinder, substantially as set forth.

4. The combination, with the engine crank-shaft and cams, of the levers, pumps, plungers, plunger-cylinders, connecting-pipes to the boiler, and the adjustable fulcra for the pump-levers, substantially as set forth.

5. The combination, with the oscillating engine-cylinder and its tubular trunnions, of the steam and exhaust pipes passing into those trunnions, the packing for such pipes, and the cross-bar with central bearing upon the bends of the pipes, substantially as set forth.

6. The oscillating steam-engine cylinder, having a surrounding jacket with a partition to form steam and exhaust ways, in combination with the removable double heads and steam and exhaust valves, substantially as set forth.

7. The combination, with the oscillating engine, of the rock-shafts and bearings upon the cylinder-heads, the arms of the rock-shafts, the valves, valve-stems, and stationary cams or trippers, substantially as set forth.

8. The steam-valve provided with the steam-ports 36 and 38 in it, and the shoulder for the steam to act upon, in combination with the cylinder in which such valve slides, and the primary valve within the steam-valve, substantially as set forth.

Signed by me this 25th day of May, A. D. 1882.

J. H. PENDLETON.

Witnesses:
GEO. T. PINCKNEY,
WILLIAM G. MOTT.